Nov. 23, 1965
J. D. SWISHER
3,218,959
MACHINE FOR MAKING POTATO CHIPS
Filed Dec. 26, 1963
3 Sheets-Sheet 1
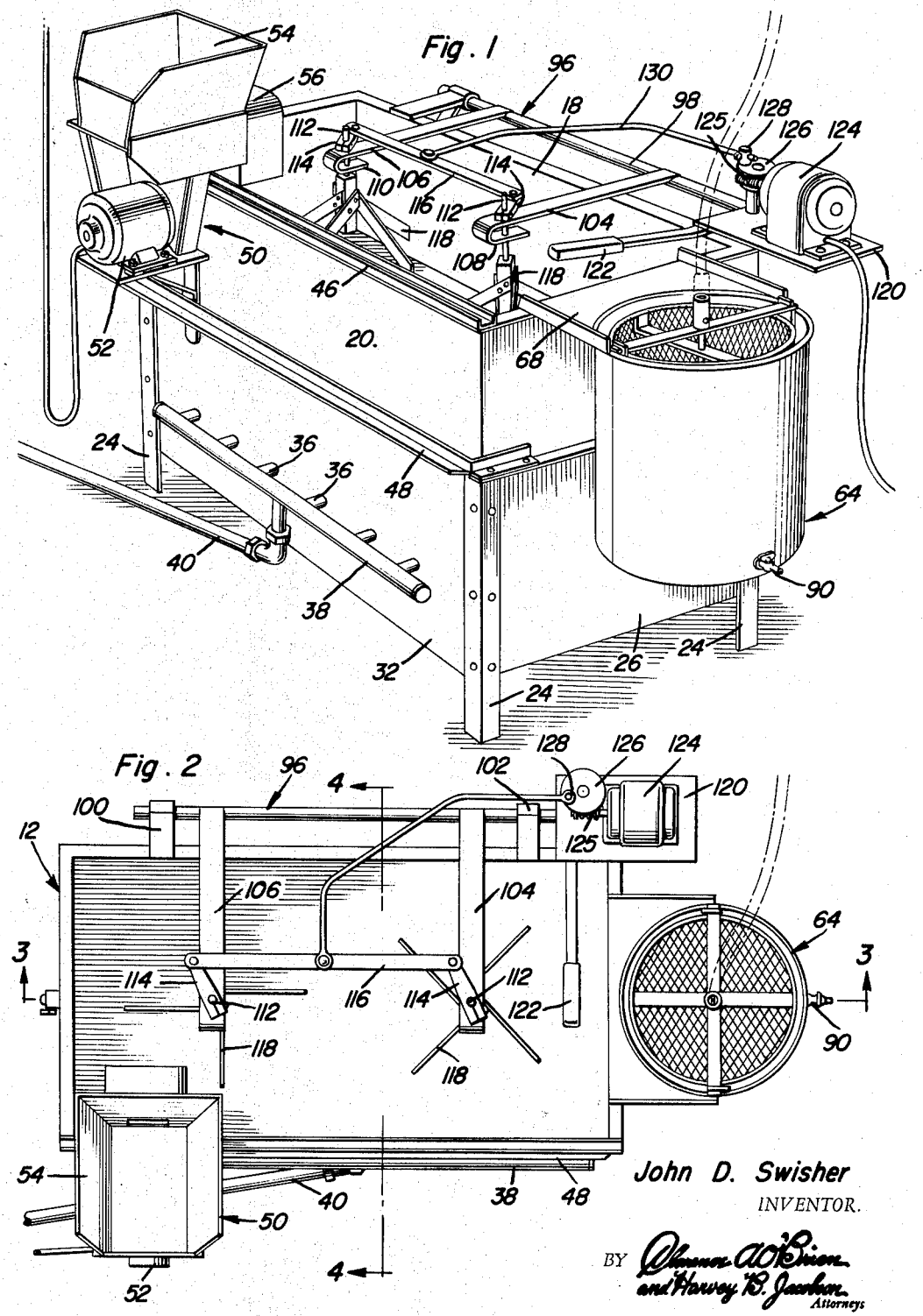
John D. Swisher
INVENTOR.

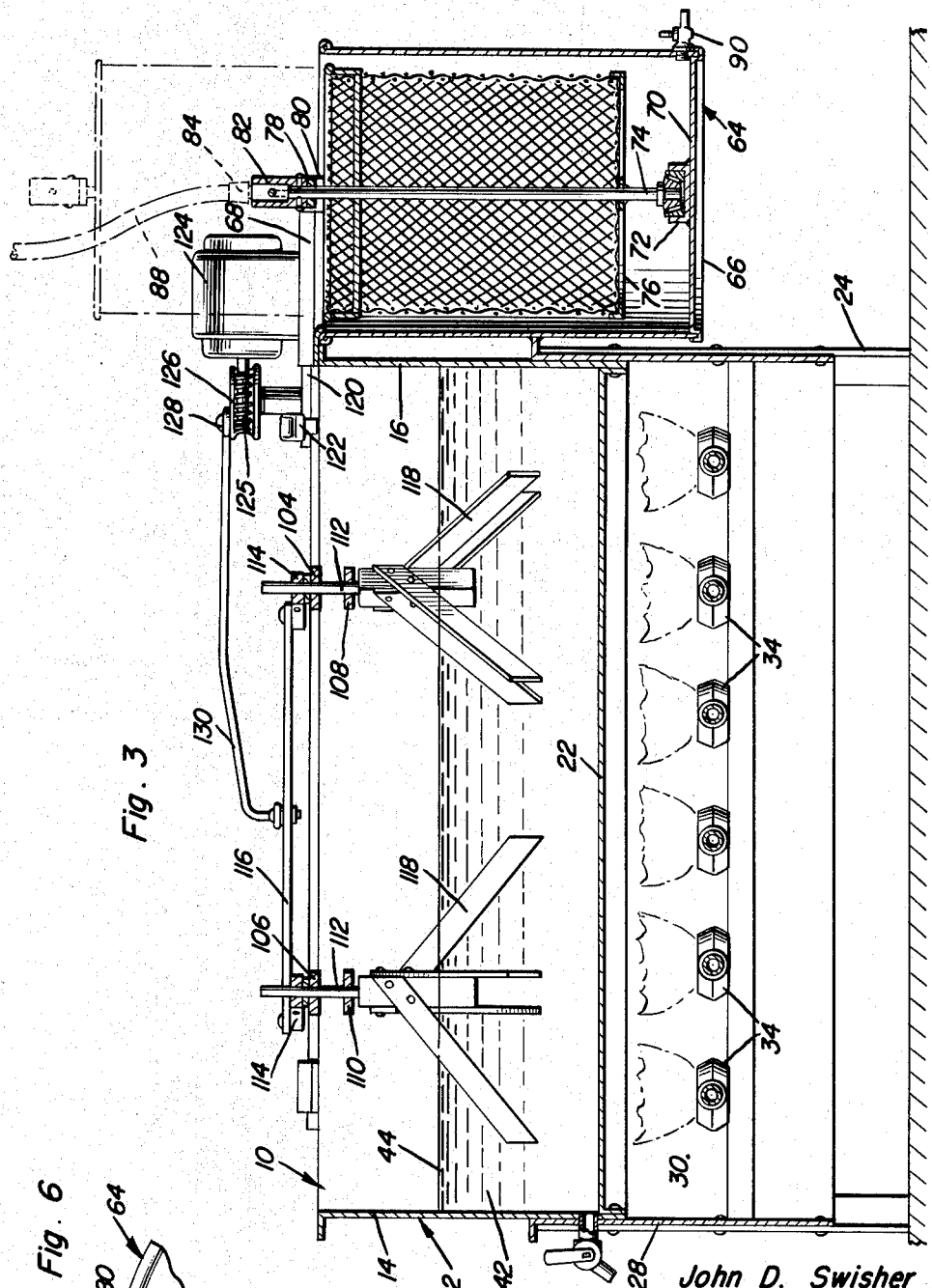

Nov. 23, 1965   J. D. SWISHER   3,218,959
MACHINE FOR MAKING POTATO CHIPS
Filed Dec. 26, 1963   3 Sheets-Sheet 3

John D. Swisher
INVENTOR.

United States Patent Office 3,218,959
Patented Nov. 23, 1965

3,218,959
MACHINE FOR MAKING POTATO CHIPS
John D. Swisher, 1363 Salem Ave., Hagerstown, Md.
Filed Dec. 26, 1963, Ser. No. 333,336
4 Claims. (Cl. 99—353)

This invention relates to a novel and useful machine for making potato chips and more specifically to an open top cooking vat with heating means and adapted to received foodstuffs therein which are to be cooked.

The vat of the instant invention is provided with heating means of any conventional type for heating the cooking liquid disposed therein and it may be provided with a slicing or chopping machine adapted to receive foodstuffs which are to be chopped and to discharge chopped foodstuffs into the cooking vat.

In addition, the machine of the instant invention includes a support frame which is pivotally supported from one side wall of the vat and which includes motor means, agitator means movably supported from the support frame for actuation by the motor means and power transmission means operatively drivingly connecting the motor means to the agitator means. The support frame, by being pivotally secured to the vat, is swingable between an operative position with portions thereof overlying the vat and the agitator means disposed within the vat below the upper edges of the side walls thereof in position to agitate the cooking liquid and the foodstuffs disposed therein as the latter are cooked, and an inoperative position with said frame, agitator means, motor means and power transmission means disposed to one side of said vat.

When the foodstuffs within the cooking vat have been cooked, the support frame carrying the agitator means, the motor means and the power transmission means drivingly connecting the motor means to the agitator means, may be swung to an inoperative position disposed to one side of the cooking vat whereby a suitably foraminated scoop or the like may be utilized to scoop the cooked foodstuffs from within the vat. In addition to being provided with a foodstuffs slicing or chopping attachment, the vat of the instant invention also includes a centrifuge comprising a foraminated drum which is supported for rotation about an upstanding axis within an outer drum and which may be driven by any suitable motor means for spinning the residue of cooking liquid from the cooked foodstuffs disposed therein, the outer drum being provided to collect the cooking liquid removed from the cooked foodstuffs.

The main object of this invention is to provide a machine for making potato chips comprising a cooking vat constructed in a manner whereby successive batches of potato chips and the like may be readily cooked with a minimum amount of effort being involved in placing the potato chips or other foodstuffs within the cooking vat and removing the cooked potato chips or other foodstuffs from the cooking vat.

A further object of this invention, in accordance with the preceding object, is to provide a machine including a food cutter or chopper for receiving foodstuffs to be cut or chopped and including a discharge for discharging the cut food therefrom directly into the cooking vat.

Still another object of this invention is to provide a food cutter or chopper which is mounted on the cooking vat of the instant invention in a manner whereby it may be moved along one side of the cooking vat so as to distribute the cut foodstuffs being discharged into the vat thereby enabling a single batch of foodstuffs to be cooked to be more quickly cut and discharged into the vat without piling the foodstuffs in one location.

Still another object of this invention is to provide a centrifuge attachment on the cooking vat of the instant invention including means by which the cooked foodstuffs may be spun at high speed so as to spin the residue of cooking liquids therefrom.

Yet another object of this invention is to provide agitator means for agitating the cooking liquid within the vat of the instant invention and also the foodstuffs disposed within the cooking liquid and mounted on the vat in a manner whereby the agitator means may be readily shifted to an inoperative position disposed to one side of the vat thereby providing unobstructed access to the interior of the vat for scooping the cooked foodstuffs therefrom prior to their being placed within the aforementioned centrifuge.

A final object of this invention to be specifically enumerated herein is to provide a machine for making potato chips in accordance with the preceding objects which will conform to conventional forms of manufacture, be of simple construction and easy to use, so as to provide a device that will be economically feasible, long-lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the machine of the instant invention;

FIGURE 2 is a top plan view of the machine of the instant invention;

FIGURE 3 is a longitudinal vertical sectional view on somewhat of an enlarged scale and taken substantially upon the plane indicated by the section line 3—3 of FIGURE 2;

Figures 4, 5:
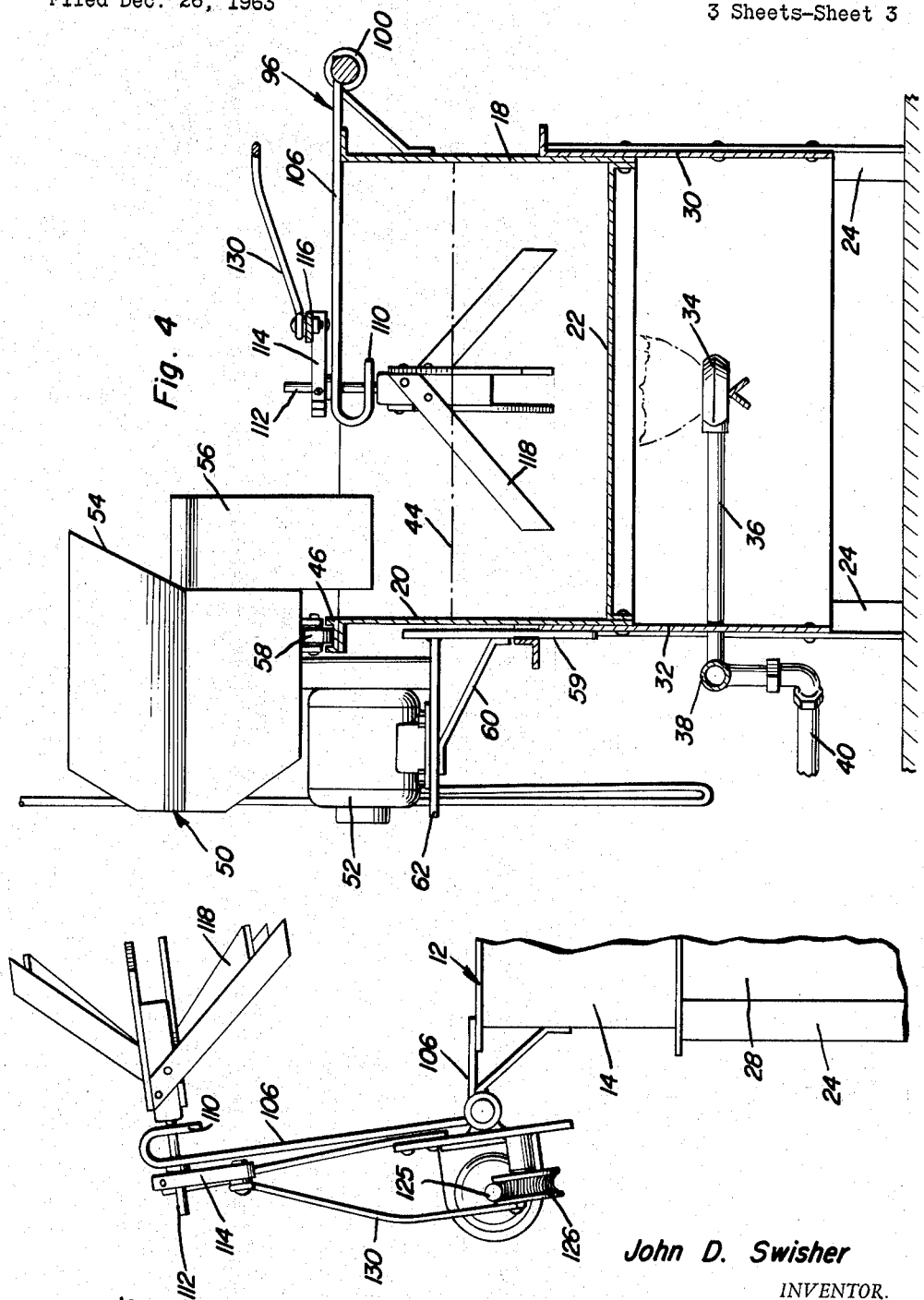
FIGURE 4 is a transverse vertical sectional view taken substantially upon the plane indicated by the section line 4—4 of FIGURE 2 and on somewhat of an enlarged scale.

FIGURE 5 is a fragmentary enlarged end elevational view of the machine of the instant invention as seen from the left side of FIGURE 2 and with the support frame which carries the motor means and the agitator means pivoted to the inoperative out-of-the-way position; and FIGURE 6 is a fragmentary enlarged perspective view of the upper portion of the outer drum of the centrifuge attachment of the instant invention showing the manner in which the inner foraminated drum may be releasably supported within the outer drum.

With attention now directed more specifically to the drawings the numeral 10 generally designates the machine of the instant invention which comprises a vat generally referred to by the reference numeral 12 including a pair of end walls 14 and 16 and a pair of opposite side walls 18 and 20 interconnected at their lower ends by means of a bottom wall 22. The vat 12 is supported at its four corners by means of four upstanding legs 24 and includes a pair of opposite end skirts 26 and 28 and a pair of opposite side skirts 30 and 32.

The area defined between the skirts 26, 28, 30 and 32 and below the bottom wall 22 defines a burner compartment in which a plurality of gas-fired burners 34 or the like are disposed. The burners 34 include inlet pipes 36 which extend from a header pipe 38 to the individual burners 34 and the header pipe 38 may be connected to a suitable source of gas under pressure by means of a delivery pipe 40.

Cooking liquid such as cooking oil 42 is disposed within the vat 12 to the level 44 and the upper edge portion of the side wall 20 has a track channel 46 secured thereto, a second angle track 48 extending along the lower edge of the side wall 20. A food slicing assembly generally referred to by the reference numeral 50 is provided and is powered by means of an electric motor 52. The slicing assembly 52 includes any suitable food cutter (not shown) which is driven by the motor 52 and a hopper 54 for receiving the food which is to be sliced. The food slicing assembly further includes an outlet 56 for discharging the sliced food and it will be noted that the outlet 56 is disposed inwardly of the side wall 20. The hopper 54 includes a pair of supporting rollers 58 which are spaced longitudinally of the channel 46 and are rollingly engaged therewith and a depending guide flange 59 which is received between the angle track 48 and the skirt 32, the angle track 48 being spaced slightly outwardly of the skirt 32 so as to define a slot between the angle track 48 and the skirt 32. Still further, the assembly 50 includes an inclined brace 60 which is interconnected between the guide flange 59 and the support platform 62 thereof, the lower end of the inclined brace being spaced slightly above the upper edge of the angle track 48 and the support platform 60 being utilized to support the electric motor 52.

It may best be seen from FIGURES 1 and 3 of the drawings that the machine 10 further includes a centrifuge assembly generally referred to by the reference numeral 64. The centrifuge assembly 64 includes an outer drum 66 which is suitably supported from the end wall 16 and the skirt 26 in any convenient manner. A table 68 extends between the upper end of the end wall 16 and the upper periphery of the outer drum 66.

The bottom wall 70 of the outer drum 66 includes a bearing journal 72 which rotatably journals the lower end of a support shaft 74 which extends upwardly through a foraminated inner drum 76. The inner drum 76 is mounted on the shaft 74 for rotation therewith and journaled at its upper end by means of a transverse brace 78 that rotatably receives the upper end of the support shaft 74 and is releasably secured to the slotted mounting ears 80 carried by opposite sides of the outer drum 66. The upper end of the support shaft 74 includes a suitable socket 82 for releasable connection with the output end 84 of a flexible drive shaft 88 which may be operatively connected to any suitable motive force.

The outer drum 66 is provided with a drain petcock 90 and any liquids removed from material disposed within the inner drum 76 collected within the outer drum 66 may be drained from the latter by means of the petcock 90.

The machine 10 further includes a support frame generally referred to by the reference numeral 96 and it may be seen from FIGURES 1 and 2 of the drawings that the support frame 96 includes an elongated member 98 which is journaled for rotation about its longitudinal axis by means of a pair of laterally outwardly projecting journals 100 and 102 supported from the upper portion of the side wall 18. The longitudinal member 98 has a pair of laterally projecting support arms 104 and 106 mounted thereon for rotation therewith and the free ends of the arms 104 and 106 are curved back upon themselves as at 108 and 110. A pair of operating shafts 112 are rotatably supported from the free ends of the arms 104 and 106 and are interconnected by means of a pair of crank arms 114 connected thereto and interconnected at their outer ends by means of a connecting rod 116. The lower ends of the operating shafts 112 have a pair of agitator assemblies 118 mounted thereon and a mounting plate 120 is carried by one end of the elongated member 98 and has an operating handle 122 secured thereto. The mounting plate 120 supports an electric motor 124 having an output shaft on which a worm gear 125 is mounted. The worm gear 125 is meshed with a driven gear 126 that is rotatably journaled from the motor 124 and has an eccentric pin 128 oscillatably secured thereto. A connecting rod 130 has one end secured through the oscillatable pin 128 and the other end pivotally connected to the connecting rod 116.

The worm gear 125 and the gear wheel 126 comprise power transmitting means for transmitting power from the electric motor 124 to the operating shaft 112 together with the rods 116 and 130 and the crank arms 114. Thus, it may be seen that upon operation of the electric motor 124 the gear wheel 126 will be rotated thus imparting reciprocating movement to the rod 130 and oscillating movement to the operating shafts 112.

In operation, the potatoes to be sliced may be dumped in the hopper 54 whereupon the slicer (not shown) driven by the electric motor 52 will slice the potatoes and discharge the potato slices from the outlet 56 into the vat 12. Inasmuch as the assembly 50 may be moved longitudinally of the side wall 20 of the vat 12, an entire batch of potato chips may be quickly discharged into the vat 12 without piling the potato chips on top of each other. While the cooking liquid 42 cooks the potato slices, the agitator assemblies 118 will be oscillated by means of the electric motor 124 and agitate the cooking liquid 42 and the potato chips.

After the potato slices have been cooked, the frame 96 may be pivoted from its first position illustrated in FIGURE 1 of the drawings to its second position illustrated in FIGURE 5 of the drawings whereby the entire upper end of the vat 12 will be unobstructed and free to have a foraminated scoop or the like dipped therein for scooping the cooked potato slices out of the cooking liquid 42. The cooked potato slices may then be placed within the inner drum 76 and rotated at high speed by means of the flexible shaft 88 to remove the excess cooking liquid clinging to the potato slices. The excess cooking liquid may be drained from the outer drum 66 by means of the petcock 90.

In pivoting the support frame 96 from the first position illustrated in FIGURE 1 of the drawings to the second position illustrated in FIGURE 5 of the drawings, the operating handle 122 may be utilized and it may be seen that the mounting plate 120 and the arms 104 and 106 abut the upper edge of the side wall 18 of the vat 12 to establish the first position of the support frame 96 and prevent the free ends of the arms 104 and 106 from swinging down into the vat 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for making potato chips comprising an open top vat including upstanding side walls interconnected at their lower edges by means of a bottom wall, heater means operatively associated with said vat for heating the latter, a support frame, means pivotally supporting said support frame from the upper portion of one of said side walls for movement about a generally horizontally disposed axis between first and second positions, motor means supported from said support frame, agitator means movably supported from said support frame, power transmission means supported from said support frame and operatively drivingly connecting said motor means to said agitator means, said agitator means, when said frame is in said first position, including portions thereof disposed down in said vat below the upper edges of said side walls and adapted to agitate heated cooking liquids disposed in said vat and foodstuffs in said fluid, said portions of said agitator means and the remaining portions thereof, when said frame is in said second position, being raised above said side walls and disposed to one side of said vat, said frame, motor means, and said transmission means also being disposed to one side of said vat when said frame is in said second position, said frame including a first elongated member, said means pivotally supporting said frame journaling said elongated member from said one side wall for movement about a generally horizontally disposed axis extending along said one side wall, arm means including base and free ends, said arm means being secured at said base ends to said elongated member with the free ends of said arm means projecting laterally outwardly from one side of said elongated member, said agitator means including agitator element means journaled from the free ends of said arm means, said arm means, when said frame is in said first position, being generally horizontally disposed with the free ends thereof disposed over said vat, said agitator element means including a pair of agitator members each including a shaft portion journaled from the free end of a corresponding one of said arm means.

2. The combination of claim 1 wherein the free ends of said arm means each include a backturned end portion laterally spaced from the remainder of that arm means, said shaft portions each being journaled through the corresponding backturned end portion and also the adjacent portion of the remainder of the corresponding arm means.

3. A machine for making potato chips comprising an open top vat including upstanding side walls interconnected at their lower edges by means of a bottom wall, heater means operatively associated with said vat for heating the latter, a support frame, means pivotally supporting said support frame from the upper portion of one of said side walls for movement about a generally horizontally disposed axis between first and second positions, motor means supported from said support frame, agitator means movably supported from said support frame, power transmission means supported from said support frame and operatively drivingly connecting said motor means to said agitator means, said agitator means, when said frame is in said first position, including portions thereof disposed down in said vat below the upper edges of said side walls and adapted to agitate heated cooking liquids disposed in said vat and foodstuffs in said fluid, said portions of said agitator means and the remaining portions thereof, when said frame is in said second position, being raised above said side walls and disposed to one side of said vat, said frame, motor means, and said transmission means also being disposed to one side of said vat when said frame is in said second position, a food slicing assembly including an inlet hopper for receiving food to be sliced and an outlet for sliced food disposed over said vat, and means mounting said food slicing assembly on said vat for reciprocal movement along one side wall thereof.

4. A machine for making potato chips comprising an open top vat including upstanding side walls interconnected at their lower edges by means of a bottom wall, heater means operatively associated with said vat for heating the latter, a support frame, means pivotally supporting said support frame from the upper portion of one of said side walls for movement about a generally horizontally disposed axis between first and second positions, motor means supported from said support frame, agitator means movably supported from said support frame, power transmission means supported from said support frame and operatively drivingly connecting said motor means to said agitator means, said agitator means, when said frame is in said first position, including portions thereof disposed down in said vat below the upper edges of said side walls and adapted to agitate heated cooking liquids disposed in said vat and foodstuffs in said fluid, said portions of said agitator means and the remaining portions thereof, when said frame is in said second position, being raised above said side walls and disposed to one side of said vat, said frame, motor means, and said tranmission means also being disposed to one side of said vat when said frame is in said second position, said frame including a first elongated member, said means pivotally supporting said frame journaling said elongated member from said one side wall for movement about a generally horizontally disposed axis extending along said one side wall, arm means including base and free ends, said arm means being secured at said base ends to said elongated member with the free ends of said arm means projecting laterally outwardly from one side of said elongated member, said agitator means including agitator element means journaled from the free ends of said arm means, said agitator element means comprising a pair of agitator members each provided with a mounting shaft portion, said shaft portions being journaled from the free ends of said arm means, a crank arm means mounted on each of said shaft portions for oscillation therewith, a connecting rod pivotally connected at its opposite ends to the free ends of said crank arm means, said power transmission including means drivingly connecting said motor means to said connecting rod for oscillation of the latter in response to operation of said motor means.

References Cited by the Examiner
UNITED STATES PATENTS

| | | | |
|---|---|---|---|
| 430,548 | 6/1890 | Sohn | 259—117 X |
| 570,491 | 11/1896 | Mitchell | 100—196 X |
| 1,067,226 | 7/1913 | Danison | 259—122 X |
| 1,502,677 | 7/1924 | Law. | |
| 1,666,019 | 4/1928 | McCarthy | 99—355 X |
| 1,740,032 | 12/1929 | Pecard | 141—284 X |
| 2,186,345 | 1/1940 | Reidenbach | 99—409 X |
| 2,567,248 | 9/1951 | Stahmer | 146—78.2 |
| 2,851,257 | 9/1958 | Morgan | 259—122 X |

WALTER A. SCHEEL, *Primary Examiner.*

BILLY J. WILHITE, *Examiner.*